United States Patent [19]

Schrekeis et al.

[11] Patent Number: 4,496,165
[45] Date of Patent: Jan. 29, 1985

[54] ADJUSTABLE COLLET

[75] Inventors: Josef Schrekeis, Niles; Gerard P. Murphy, Chicago, both of Ill.

[73] Assignee: The Board of Trustees of The University of Illinois, Urbana, Ill.

[21] Appl. No.: 443,856

[22] Filed: Jan. 18, 1983

[51] Int. Cl.$^3$ ............................................. B23B 31/20
[52] U.S. Cl. .................................. 279/46 R; 269/283; 269/900; 279/1 SJ; 279/123
[58] Field of Search ................ 279/1 SJ, 1 A, 1 ME, 279/46, 53, 123; 269/283, 303, 900

[56] References Cited

U.S. PATENT DOCUMENTS

| 460,601 | 10/1891 | Skinner | 279/123 |
| 2,820,640 | 1/1958 | Regan | 279/1 SJ |
| 2,828,536 | 4/1958 | Kaiser | 279/123 X |
| 3,278,194 | 10/1966 | Sampson | 279/123 X |
| 3,744,809 | 7/1973 | Bennett | 279/1 SJ |

*Primary Examiner*—Z. R. Bilinsky
*Attorney, Agent, or Firm*—Mathew L. Kalinowski

[57] ABSTRACT

An adjustable collet is provided comprising a step collet, a plurality of machinable and removable jaws, and means for interlocking the jaws with the step collet. The interlocking means comprise counter-bored and threaded holes spaced on the face of the collet, and hollow bosses projecting from one surface of the jaws and aligned with counter-bored or counter-sunk holes on the opposite surface, the interlocking means being effected by mating the jaw bosses with the holes in the collet face and by engaging screws passing through the holes and bosses in the jaws to the threaded holes in the collet face. To further increase the capacity of the collet, extension bars are utilized that incorporate the above-described interlocking means.

2 Claims, 3 Drawing Figures

U.S. Patent  Jan. 29, 1985  4,496,165
FIG. 1
FIG. 2
FIG. 3
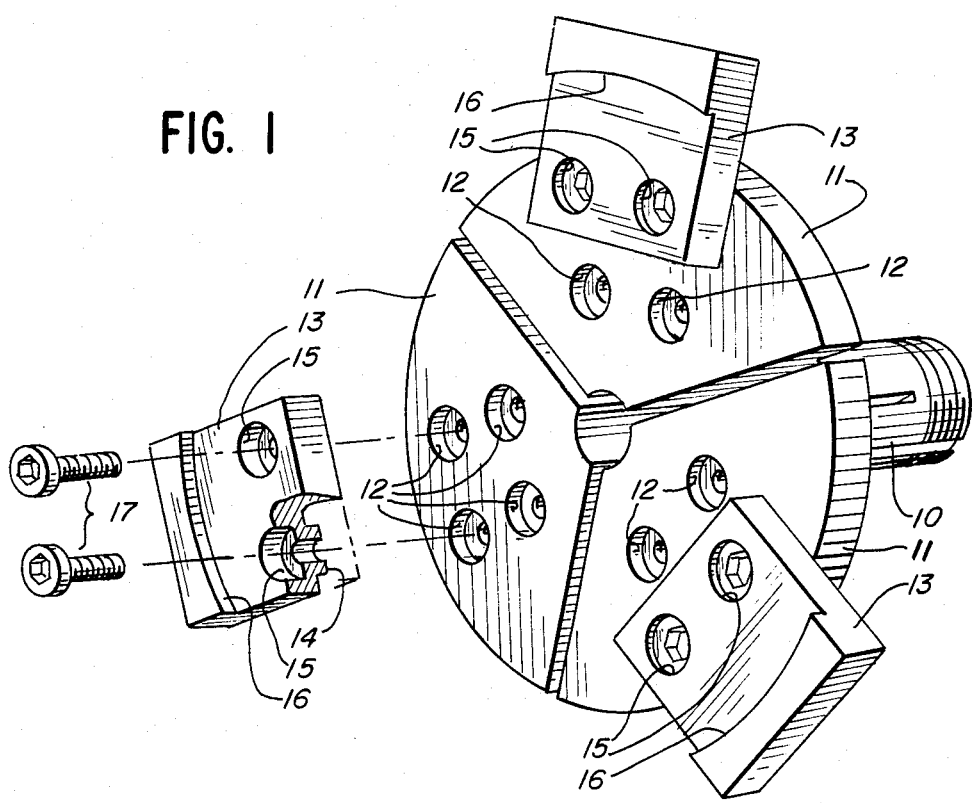
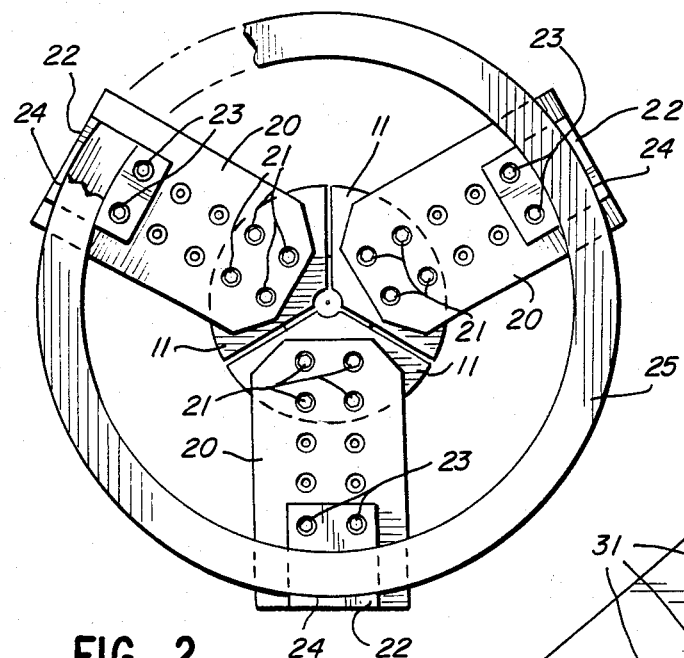
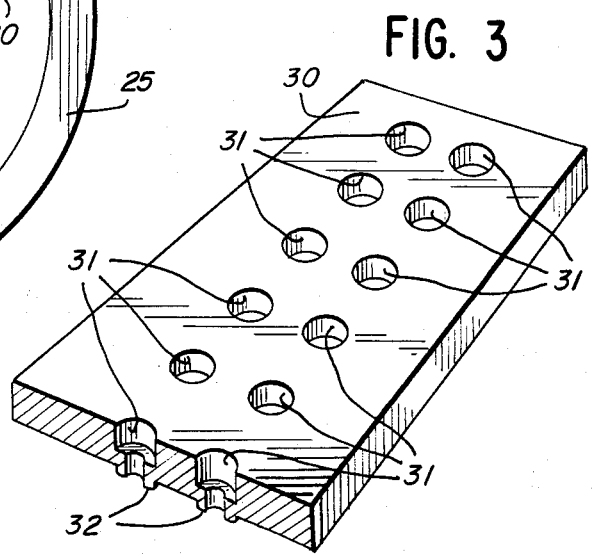

ADJUSTABLE COLLET

This invention relates to collets and in particular to adjustable collets provided with removable work-engaging jaws and extension bars therefor.

Collets are holding devices for use in machining, fastening, and layout operations. The basic shape is a slotted tube with a short taper flared out at the front end of the collet. The back end of the collet has a male threaded portion and three, or more, slots equally spaced passing from the outer diameter to the center. From the front end, the slots extend along two-thirds of the length of the collet. The action of the nut being tightened or loosened on the threaded portion of the collet causes the tapered end to move in and out of a mated tapered sleeve, which causes the front end to expand or contract. These features give the collet its gripping power.

Collets such as the "5C" collets are available to hold round, square, and hexagonal bars. The "5C" collets for round stock range in hole diameter from about 1/16" to about 1⅛", the holes increasing in increments of 1/64". Thus, a separate collet is required for each size of work stock.

Step collets have oversize heads of soft metal with a thickness of about 1 3/16" and a range in diameter from about 2" to about 6". The head is machined to the desired diameter for the work stock; smaller diameters can be provided by machining in concentric steps toward the center hole in the collet. Step collets, however, are limited in the number of step diameters that can be machined and the collet heads are eventually used up due to repeated machining to fit the changes in work-piece diameters. The stepcollets are also limited in depth of steps when used for a range of workpiece sizes.

Accordingly, it is an object of this invention to provide an improved collet that overcomes the disabilities of prior-art collets.

It is another object of this invention to provide a collet with removable work-engaging jaws that can be machined to hold workpieces having a wide range of sizes.

It is still another object of this invention to provide a collet with removable work-engaging jaws which in combination with extension bars can accept workpieces up to 10" or more in size.

These and other objects will become apparent as description of the invention proceeds.

In accordance with this invention, an adjustable collet is provided comprising in combination a step collet, a plurality of machinable and removable jaws, and means for interlocking the jaws with the step collet. The interlocking means can suitably comprise counter-bored and threaded holes spaced on the face of the step collet, and hollow bosses projecting from one surface of the jaws and aligned with counter-bored or counter-sunk holes on the opposite surface, the interlocking being effected by mating the jaw bosses with the holes in the collet face and by passing screws through the holes and bosses in the jaws and engaging the threaded holes in the collet face. The jaws are machined to hold various shaped work stock, for example round or hexagonal stock. The interlocking means assure repeatable positioning of the jaws on the collet face. Accordingly a set of jaws can be machined to provide an adjustable and interchangeable holding capacity for variously sized, as well as variously shaped, work stock.

To further increase the capacity of the collet, extension bars are utilized that incorporate the above-described interlocking means. The extension bars are fastened to the collet face by means of mating bosses and holes to provide a surface extending beyond the circumference of the step collet, on which surface the jaws are mounted to provide an increased holding capacity.

BRIEF DESCRIPTION OF THE DRAWING

FIG. 1 is a perspective view of the adjustable collet.

FIG. 2 shows the collet with extension bars and jaws holding a circular work-piece.

FIG. 3 shows prepared stock from which adjustable jaws and extension bars can be cut.

DESCRIPTION OF THE PREFERRED EMBODIMENTS

The invention is further illustrated by reference to the following examples.

The collet shown in FIG. 1 comprises a 4" step collet 10, each section 11 of which contains four counter-bored, threaded holes. Each hole has the dimensions of the hole at 12 in that it is threaded to receive a ¼"—20 machine screw and is counter-bored or counter-sunk ½" in diameter to a depth of ⅜".

Jaws 13 are fitted to sections 11 by means of interlocking ½" bosses 14 and ¼"—20 machine screws 17 passing through the ½" counter-bored or counter-sunk holes 15 drilled to a depth of ⅜" and engaging the threaded holes 12. The jaws 13 are machined to provide holding surfaces 16 for a circular work-piece.

FIG. 2 shows extension bars 20 fastened to sections 11 of the collet by means of mating and interlocking bosses and screws at 21. Jaws 22 are mounted on the extension bars 20 by means of bosses and screws at 23. Jaws 22 are machined to provide a holding surface for work-piece 25.

FIG. 3 shows ½" soft metal stock 30 fabricated to proved a plurality of ½" counter-bored or counter-sunk holes 31, and ½" bosses 32. From stock fabricated in this manner, jaw pieces and extension bars can be cut to fit work-pieces of various sizes and shapes.

It is clear that the collet of this invention provides a high degree of versatility and avoids many of the limitations of prior-art collets. With the jaws mounted as shown in FIG. 1, the range of the collet is from zero to 4⅞". With the addition of the extension bars as shown in FIG. 2, the range is increased to 10" diameter, or up to the full swing of the lathe (distance between spindle hole and lathe headway). It is contemplated that other holding devices can be adapted to accept the extension bars and jaws of this invention; for example, universal 3-jaw chicks, drill press vises, milling machine vises, and the like.

Although this invention has been described with particular reference to certain preferred embodiments thereof, it is inderstood that variations and modifications can be effected within the scope and spirit of the appended claims. It is intended that all matter contained in the above description and figures shall be interpreted in an illustrative and not in a limiting sense.

What is claimed is:

1. An adjustable collet comprising in combination a step collet, a plurality of extension bars, and a plurality of jaws for securely holding a work-piece, the step collet face having counter-bored and threaded holes spaced thereon, the extension bars having hollow bosses projecting from one surface which are aligned with counter-bored holes on the opposite surface, and the jaws having hollow bosses projecting from one surface which are aligned with counter-bored holes on the opposite surface, the extension bars being fastened to the collet face by mating the bosses with the holes in the collet face and by engaging screws passing through the counter-bored holes and the hollow bosses to the threaded hole in the collet face, and the jaws being fastened to the extension bars by mating the jaw bosses with the counter-bored holes in the extension bars and engaging screws passing through the counter-bored and hollow bosses in both jaws and extension bars to the threaded hole in the collet face.

2. The collet of claim 1 wherein the face of the step collet comprises three sections each of which has at least two of said counter-bored and threaded holes, and to each of which is fastened an extension bar and jaw piece by means of said bosses and counter-bored or counter-sunk holes.

* * * * *